United States Patent
Raghuvanshi (10) Patent No.: US 7,219,245 B1
(45) Date of Patent: May 15, 2007

(54) ADAPTIVE CPU CLOCK MANAGEMENT

(75) Inventor: Preetham Raghuvanshi, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 370 days.

(21) Appl. No.: 10/860,695

(22) Filed: Jun. 3, 2004

(51) Int. Cl.
*G06F 1/26* (2006.01)
*G06F 1/28* (2006.01)

(52) U.S. Cl. .................. 713/322; 713/300; 713/310; 713/321; 713/323; 713/324; 713/330; 713/340

(58) Field of Classification Search ............... 713/300, 713/310, 320–324, 330, 340
See application file for complete search history.

(56) References Cited

U.S. PATENT DOCUMENTS

| | | | |
|---|---|---|---|
| 5,812,860 A * | 9/1998 | Horden et al. ............... | 713/322 |
| 6,216,235 B1 * | 4/2001 | Thomas et al. ............. | 713/501 |
| 6,397,343 B1 * | 5/2002 | Williams et al. ............ | 713/501 |
| 6,711,447 B1 * | 3/2004 | Saeed .......................... | 700/82 |
| 6,988,211 B2 * | 1/2006 | Cline et al. ................. | 713/300 |
| 7,000,130 B2 * | 2/2006 | Adachi ........................ | 713/322 |
| 2005/0132238 A1 * | 6/2005 | Nanja .......................... | 713/300 |

OTHER PUBLICATIONS

Sukjae Cho, "Power Management of iPAQ" (date unknown).

Intel web page entitled "Enhanced Intel Speedstep® Technology" (http://www.intel.com/technology/itj/2003/volume07issue02/art03_pentiumm/p10_speedstep.htm?iid=ipp_dlc_procmp4f+speedstep&) (printed Sep. 1, 2004).

AMD web page entitled "AMD PowerNow!™ Technology Overview" (www.amd.com/us-en/Processors/ProductInformation/0,,30_118_10220_10221 964,00.html) (printed Aug. 31, 2004).

AMD web page entitled "Featuring AMD PowerNow!™ Technology" (http://www.amd.com/us-en/assets/content_type/DownloadableAssets/Power_Now2.pdf) (printed Aug. 31, 2004) undated.

Intel web page entitled "Mobile Intel® Pentium® III Processors: Enhanced Intel Speedstep(R) Technology" (http://support.intel.com/support/processor/mobile/pentiumiii/sb/CS-007522.htm) (printed Aug. 31, 2004).

Intel White Paper entitled "Enhanced Intel® SpeedStep® Technology for the Intel® Pentium® M Processor" (Mar. 2004).

Intel White Paper entitled "Wireless Intel SpedStep® Power Manager" (2004).

* cited by examiner

*Primary Examiner*—A. Elamin
(74) *Attorney, Agent, or Firm*—Hamilton & Terrile, LLP; Michael Rocco Cannatti (57) ABSTRACT

A method and system for efficiently managing power consumption in a digital processor controls the CPU clock rate based on actual CPU workload by monitoring a measure of the CPU's activity to estimate the required clock speed consumption and adjusting the clock rate up or down to meet the actual estimated speed consumption. In an exemplary embodiment, a measure of the CPU's idleness is monitored and used, along with other parameters, to compute required clock speed changes.

25 Claims, 3 Drawing Sheets

ADAPTIVE CPU CLOCK MANAGEMENT

BACKGROUND OF THE INVENTION

1. Field of the Invention

The present invention relates in general to the field of data processing. In one aspect, the present invention relates to a method and system for reducing power consumption in a digital processor.

2. Description of the Related Art

In general, data processors are capable of executing a variety of instructions. Processors are used in a variety of applications, including communication systems formed with wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital amps, global system for mobile communications (GSM), code division multiple access (CDMA), local multi-point distribution systems (LMDS), multi-channel-multi-point distribution systems (MMDS) and/or variations thereof. Especially with wireless and/or mobile communication devices (such as a cellular telephone, two-way radio, personal digital assistant (PDA), personal computer (PC), laptop computer, home entertainment equipment, etc.), the processor or processors in a device must be able to run various complex communication programs using only a limited amount of power that is provided by power supplies, such as batteries, contained within such devices. Because of the computational intensity (and the associated power consumption by the processor(s)) for communication functions, it is an important goal in the design of wireless and/or mobile communication devices to minimize processor and other module operations (and the associated power consumption). It is particularly crucial for mobile applications in order to extend battery life.

With conventional solutions for saving power, a variety of complex circuit and software designs have been proposed. These mechanisms typically implement CPU clock management by switching between an active mode and an idle mode. In the idle mode, the processor has no work to do and the CPU stops its clocking and waits for an interrupt. The CPU reverts back to active mode whenever it has work to do, and in this active mode, the CPU resumes its maximum pre-configured clock speed. This approach exhibits substantial latencies for entering and leaving the idle mode, which restricts the power that can be saved and the range of applicability because these latencies may preclude a processor from being able to deactivate modules before having to reactivate them. Moreover, these mechanisms are inefficient, in that they over-react to processing activity by placing the CPU clock in either a fully "on" or fully "off" state, or otherwise provide only limited or predetermined clock frequency modes of operation. Other mechanisms, such as implemented with iPAQ, Intel SpeedStep and AMD PowerNow! devices, use software to control the CPU frequency or voltage, though a major problem with this approach is that the load estimating software itself creates an extra load on the CPU, reducing the power saving benefits of such an approach. Software-based frequency control also suffers from response time latencies that can impede real-time performance requirements, especially when implemented with complex signaling mechanisms and processor state transitions which require significant hardware and software support.

In addition to the complexity of the computational requirements for a communications processor, such as described above, the ever-increasing need for higher speed communications systems imposes additional performance requirements and resulting costs for communications systems. In order to reduce costs, communications systems are increasingly implemented using Very Large Scale Integration (VLSI) techniques. The level of integration of communications systems is constantly increasing to take advantage of advances in integrated circuit manufacturing technology and the resulting cost reductions. This means that communications systems of higher and higher complexity are being implemented in a smaller and smaller number of integrated circuits. For reasons of cost and density of integration, the preferred technology is CMOS. To this end, digital signal processing ("DSP") techniques generally allow higher levels of complexity and easier scaling to finer geometry technologies than analog techniques, as well as superior testability and manufacturability.

Therefore, a need exists for a method and apparatus that provides reduced power consumption with a more efficient CPU clocking scheme. In addition, a need exists for reducing processor power consumption without requiring complex hardware and elaborate signaling mechanisms. Moreover, a need exists for improved selectivity when adjusting the clock frequency or voltage levels during runtime operations. There is also a need for a better system that is capable of performing the above functions and overcoming these difficulties without increasing circuit area, operational power and software overhead. Further limitations and disadvantages of conventional systems will become apparent to one of skill in the art after reviewing the remainder of the present application with reference to the drawings and detailed description which follow.

SUMMARY OF THE INVENTION

Broadly speaking, the present invention provides an efficient, intelligent, self-adaptive method and system for managing CPU power usage by adapting CPU(s) clock speeds on a continuous basis during runtime, depending upon estimated work requirements. By tuning the clock speed of the CPU(s) to the actual workload, the required clocking signals are implemented as a consumer-supplier model. When the workload for the CPU(s) increases, more clock speed is supplied. On the other hand, when the workload reduces (such as can occur when the clock speed capacity is under-utilized), the clock speed is reduced.

In accordance with various embodiments of the present invention, a method and apparatus provides a power saving mechanism for a programmable communications processor. The power saving mechanism may be implemented by continuously and automatically controlling the CPU clock speed to track the actual work requirements from the CPU at any given time. In a selected embodiment, the required CPU clock speed is estimated by monitoring the processor(s) idleness and adjusting the clock speed to maintain a target level of idleness, thereby providing improved effectiveness, reduced latency, simplified programming and reduced hardware overhead.

In accordance with selected illustrative embodiments, a digital processor is disclosed for use in a variety of applications, including a wireless communication device, desktop computer, mobile device, SOC, microcontroller, communications processor, and the like. The digital processor may include a processing unit and a processing unit clock that has an adjustable clock speed. In addition, one or more control registers may be provided for storing a targeted activity measure (e.g., an idleness measure) for the processing unit and/or for storing a tolerance measure. With this configuration, a measurement module monitors change in the processing unit activity and issues an interrupt if a change in the processing unit activity exceeds the tolerance measure. A variety of techniques can be used to measure changes in the processing unit activity, including calculating a scalar value for defining a change in the processing unit activity or calculating a time rate of change for defining a change in the processing unit activity. In response to an interrupt from the measurement module, clock control logic computes an adjusted clock speed for the processing unit clock. This computation may be made on a continuous basis during runtime or as a function of the tolerance measure. In this way, the adjusted clock speed is a function of at least the targeted activity measure for the processing unit. After a clock speed adjustment, the activity measure for the processing unit falls within the tolerance measure of the targeted activity measure. With the present invention, the adjusted clock speed may be increased to approach a maximum clock speed when an activity measure for the processing unit meets or approaches a first activity measure boundary value. For example, the clock speed can increase in response to a decrease in the idleness measure, or in response to a decrease in the idleness measure beyond the tolerance measure. Likewise, the clock speed can decrease in response to an increase in an activity measure for the processing unit.

The objects, advantages and other novel features of the present invention will be apparent to those skilled in the art from the following detailed description when read in conjunction with the appended claims and accompanying drawings.

DETAILED DESCRIPTION

A method and apparatus is described for an improved digital processor, such as a can be used in communications, desktop, mobile, SOC and microcontroller applications and the like. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In accordance with a selected embodiment, the methods and systems for providing efficient power management as shown and described herein may be implemented in software and/or hardware control logic stored on a computer-readable medium and executed as a computer program on a general purpose or special purpose computer. The invention, for example, can be implemented in one a single or multi-processor wireless cellular communication devices, such as GSM (Global System for Mobile Communications), GPRS (General Packet Radio Services), EGPRS (Enhanced GPRS), 3G or EDGE (Enhanced Data GSM Environment) cell phone devices. For clarity, only those aspects of the functionality germane to the invention are described, and product details well known in the art are omitted. For the same reason, the computer hardware is not described in further detail. It should thus be understood that the invention is not limited to any specific computer language, program, or computer, and that, in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
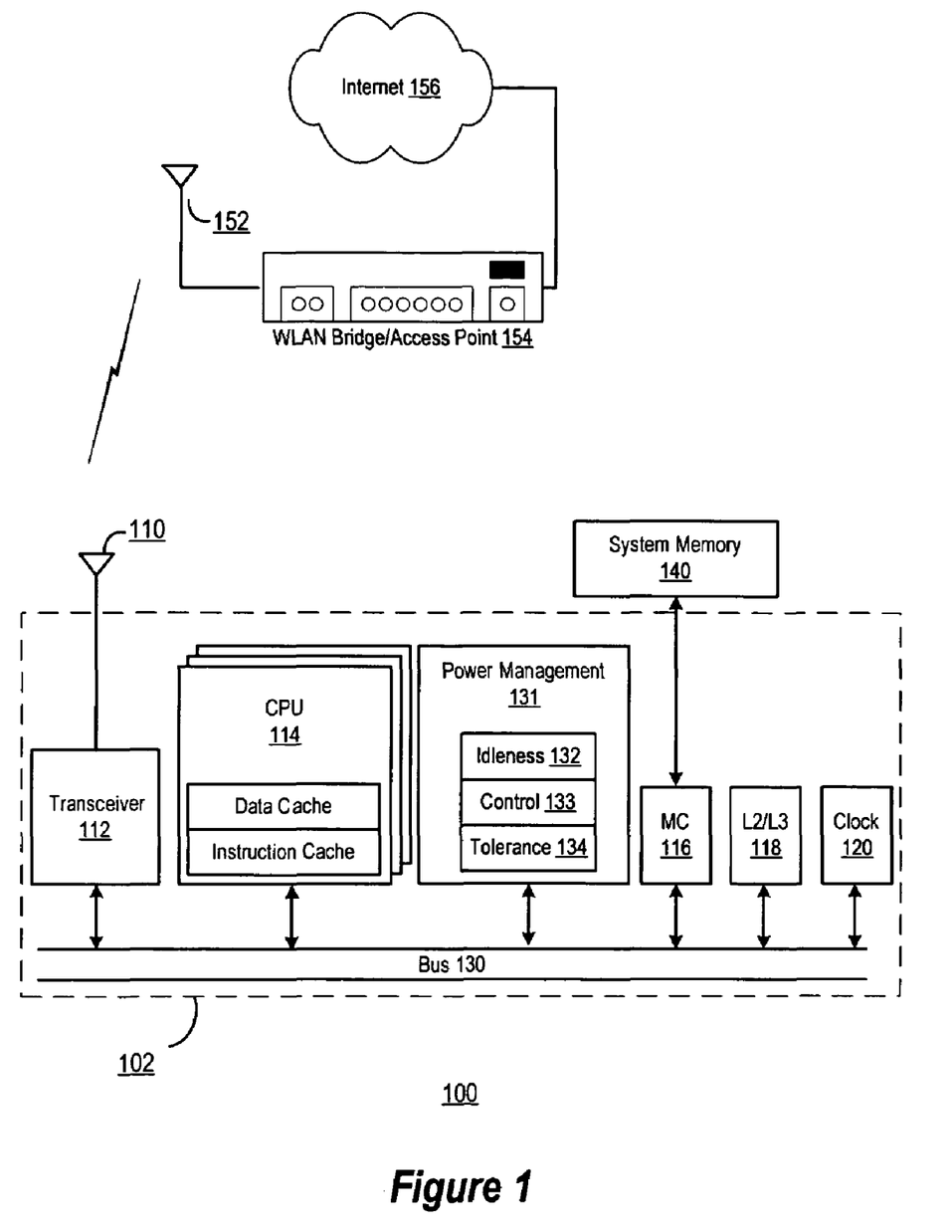
FIG. 1 is a schematic block diagram of a wireless communication device in accordance with an exemplary embodiment of the present invention.

Referring to FIG. 1, a block diagram of a communications system 100 is provided, illustrating one or more embodiments of the adaptive CPU clock management system in accordance with the present invention. In addition to being implemented on conventional computers and/or communications systems, the present invention may also be implemented on mobile devices, such as personal digital assistants, mobile or cellular phones, smart phones and other mobile devices that include programmable capabilities such as telecommunications, global position system (GPS) detection, camera or video imaging, multimedia messaging (MMS), Internet features and the like. In addition, the present invention may be implemented in a mobile computing device using a software modem to communicate in accordance with a wireless communication protocol, such as GSM, V.90, ADSL, HomePNA, Wireless LAN, etc. With the additional mobility, increased computing power and new telephony and computer-based functions being provided in mobile computer-based devices, improved power management may be provided by controlling the CPU clock frequency, which is a significant factor in determining the power consumption by the CPU(s) and other system devices identified to be clock manageable. By controlling the clock frequency to track actual workload requirements, CPU power usage is reduced.

In the communications system 100 depicted in FIG. 1, a mobile computing device 102 includes one or more central processing units (CPU) 114, a system bus 130, system memory 140, a memory controller 116 (which is used to manage memory operations with respect to a system memory 140), a power management module 131 and a programmable real time clock 120. In selected embodiments, the system memory may or may not be connected through a controller 116, and may be implemented as on-board or off-chip primary (L1), secondary (L2) and/or tertiary (L3) cache memory 118 (illustrated in FIG. 1 for architectural purposes as being directly connected to the bus 130), DDR SDRAM module(s), Flash, RAM, ROM, PROM, EPROM, EEPROM, disk drive memory devices, and the like. For clarity and ease of understanding, not all of the elements making up the mobile computing device 102 are described in detail. Such details are well known to those of ordinary skill in the art, and may vary based on the particular computer vendor and microprocessor type. Moreover, the mobile computing device 102 may include other buses, devices, and/or subsystems, depending on the implementation desired. For example, the mobile computing device 102 may include caches, modems, parallel or serial interfaces, SCSI interfaces, network interface cards, and the like. In addition, other peripheral devices may be connected to the mobile computing device 102, either directly to the bus 130 or indirectly through a peripheral controller (not shown) for controlling communications with the device 102, including a peripheral GPS receiver device, a cell phone or similar telecommunications device and/or various input/output devices (such as a keypad, keyboard, microphone, speaker, analog signal generator, mouse, I/O pad, light or LED device, display, etc.).

In a selected embodiment, the mobile computing device 102 includes a wireless transceiver device 112 which is provided to receive and transmit signals via antenna 110 to and from an access point 154 (or base station) to the Internet or other computer network 156. In operation, the wireless transceiver device 112 receives outbound data from the CPU device 114 and processes the outbound data to produce digital transmission data formatted in accordance with a particular wireless communication standard (such as IEEE 802.11 (including all current and future subsections), Bluetooth, etc.), which is then converted to an RF signal, amplified and transmitted via antenna 110. Substantially the reverse operation is performed for data reception. As will be appreciated, the wireless transceiver device 112 may be implemented as a software modem in the mobile computing device 102, or may be implemented as a GSM (Global System for Mobile Communications), GPRS (General Packet Radio Services), EGPRS (Enhanced GPRS), 3G or EDGE (Enhanced Data GSM Environment) cell phone device, or the like. In addition or in the alternative, the wireless transceiver device 112 may include a one or more digital processing modules and associated memory for performing communication processing in accordance with a particular wireless communication standard. The digital receiver functions include, but are not limited to, digital intermediate frequency to baseband conversion, demodulation, decoding and/or descrambling. The digital transmitter functions include, but are not limited to, scrambling, encoding, modulation and/or digital baseband to IF conversion. The digital receiver and transmitter processing modules may be implemented using a shared processing device, individual processing devices, or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module implements one or more of its functions via a state machine, analog circuitry, digital circuitry and/or logic circuitry, the memory storing the corresponding operational instructions may be embedded with the circuitry comprising the state machine, analog circuitry, digital circuitry and/or logic circuitry.

In the illustrated embodiment, the system memory 140 stores data and software programs that are executed and/or processed in connection with the operation of the mobile computing device 102. For example, the system memory stores operating system software, BIOS code, drivers and other applications relating to the operation of the device 102. But rather than using software stored in memory 140 to control CPU frequency or voltage, a selected embodiment of the present invention works at the hardware level by storing control parameters in CPU control registers 131 during system startup.

In the example depicted in FIG. 1, the control parameters are stored in the power management module 131 (as the CPU idleness module 132, the control module 133 and/or the tolerance module 134) during startup to configure the CPU to run in an adaptive CPU clock management mode. As will be appreciated, the power management module 131 may be included within or separate from the CPU 114. In accordance with a selected embodiment, one configurable parameter (DESIRED_IDLENESS) is used to specify a target measure of the percentage of idleness that should be maintained by the device 102. While this parameter might ideally be set to a value of "0%," the targeted idleness measure may also be a non-zero value. For example, a non-zero value of 10% is used by the clock management system to adjust CPU clock speeds so that the CPU 114 is 10% idle during steady state workloads. While a higher value for the idleness parameter will reduce the power consumption for the device, it can also adversely affect the device speed. As will be appreciated, the CPU 114 is 100% idle in idle state and 0% idle during over capacity workloads.

Another configurable parameter (ACCM_TOLERANCE) that may be used with selected embodiments of the present invention specifies a tolerance quantification within which idleness measure changes are tolerated. A minimum tolerance measure is required so that very small changes in idleness will not cause frequent clock changes for small idleness measure changes. On the other hand, too large of a tolerance measure will reduce the power saving advantages of the present invention, in that the clock speeds will not be adjusted to match the workload requirements.

An additional configurable parameter (ACCM_PERIOD) that may be used with selected embodiments of the present invention specifies a periodic time duration for monitoring CPU idleness changes. When stored in the control register 133, this parameter controls the frequency with which the control module determines if a clock speed adjustment is required by reading the measured CPU idleness. As will be appreciated, such periodic determinations are not required with an interrupt-based design which issues an interrupt to calculate the clock speed adjustment only when the CPU idleness changes by more than a predetermined or threshold tolerance margin.

Figure 2:
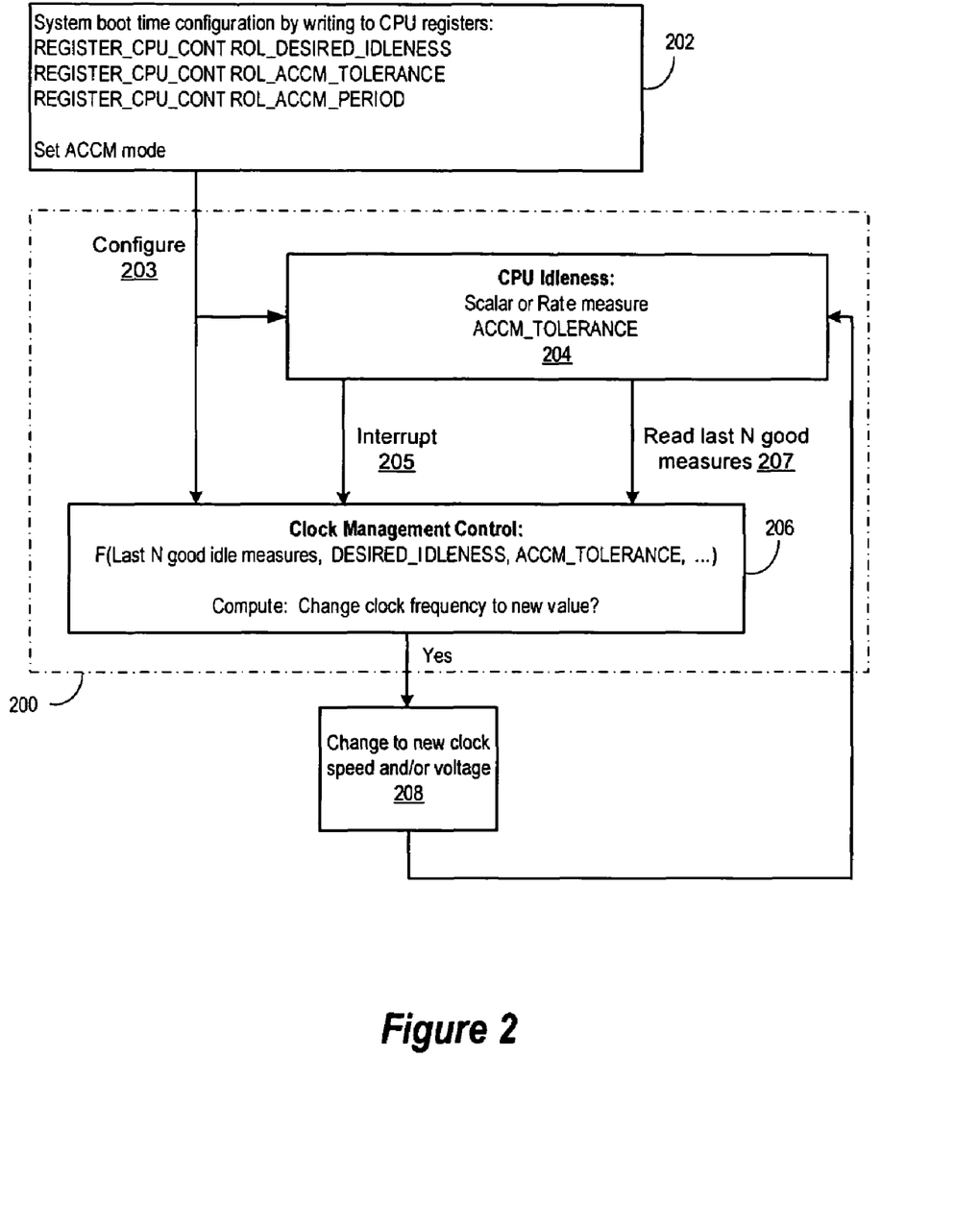
FIG. 2 shows a high level block diagram of a method and system in accordance with selected embodiments of the CPU clock management system of the present invention.

Referring now to FIG. 2, a method and system in accordance with selected embodiments of the CPU clock management system of the present invention are depicted in block diagram form. As illustrated at block 202, the CPU manages its clock frequency during runtime by configuring selected parameters into CPU control registers during startup. While various internal or external parameters may be determined by design choices that are made to define the characteristics of clock management scheme, in a selected embodiment depicted in FIG. 2, at least two parameters are used, including a desired or target measure of CPU idleness to be maintained (REGISTER_CPU_CONTROL_DESIRED_IDLENESS) and a tolerance to CPU idleness fluctuations (REGISTER_CPU_CONTROL_ACCM_TOLERANCE). Other or alternate parameters may be specified, such as, for example, a sampling period (REGISTER_CPU_CONTROL_ACCM_PERIOD) for determining how frequently clock speed adjustments are checked.

In accordance with the present invention, the CPU idleness measurement function (block 204) may be implemented as a scalar value calculation by measuring a single current value for the defined time period of interest. Alternatively, the CPU idleness measure may be implemented by determining the time rate of change of clock speeds for a plurality of measurement events. The rate of change measurement approach provides a better estimation of new clock speeds by maintaining the last N good measures of clock speed instead of just a single current measure. As will be appreciated, a measure of CPU idleness may be implemented in a variety of ways, including but not limited to using an idle tick counter, instruction code pre-fetch latency monitoring, instruction cache activity measure and the like. For example, clock speed changes can be prompted when the idleness measure departs from the desired idleness by more than the permitted tolerance. Alternatively, any idleness change beyond a threshold quantity (or a scaled threshold quantity) may be used to trigger a clock speed change.

The clock management control block 206 determines if a clock speed adjustment is required by processing selected control parameters. In a selected embodiment, the clock management control block 206 may be designed to periodically read the last N good idleness measures from the CPU idleness block 204 to determine if the idleness measures require a change in clock speed. Alternatively, the clock management control block 206 may be designed to be interrupted by the CPU idleness measure block 204 whenever significant changes (i.e., greater than the specified tolerance value) in idleness are detected. The clock management control block 206 processes the control parameter inputs to determine the need for any clock speed changes, and initiates the clock speed change, if required.

As will be appreciated, for any specific implementation of the clock management system of the present invention, the actual control parameters, their values, the CPU idleness value, and the clock management control block 206 design will dependent upon several factors, such as time delays, integrated circuit technology, design constraints, required response times etc. Of course, when designing a particular implementation of the CPU clock management system invention disclosed herein, CPU clock change delays should also be taken into account.

With reference to the system and methodology depicted in FIG. 2, a selected embodiment may be illustrated with reference to an example involving a mobile phone with a 125 MHz processor. A typical mobile phone supporting idle and active states with the clock management control system of the present invention would stop CPU clocking when the device is idle. However, when the phone user is browsing through his mobile directory, the change in processing activity (reduced idleness) would be measured by the CPU idleness block 204. If the specified tolerance limits were exceeded, an interrupt 205 is passed to the control module 206, along with the last N good measures 207. The control module then processes these parameters to determine that (in this example) the CPU clock needs to run at a higher speed (e.g., 50 MHz). If the user then uses the phone to place a call, this increase in CPU activity would again be detected at measurement block 204. If the reduction in idleness exceeded the tolerance measure (as determined at control block 206), a new clock speed (e.g., 100 MHz) is provided (at block 208). With this example, the CPU may never (or rarely run) at its maximum value, depending on the actual work requirements.

Figure 3:
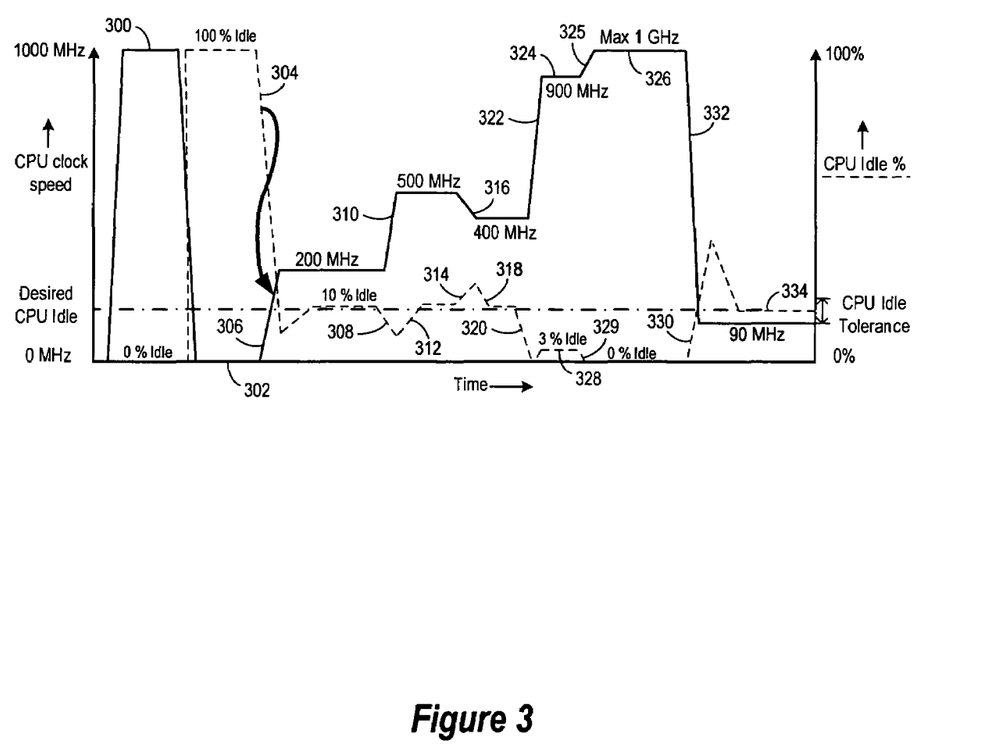
FIG. 3 depicts a plot of an exemplary adaptive CPU clock management system of the present invention.

Alternative and/or additional embodiments of the present invention may also be described with reference to an example involving a PC laptop computer with a 1 GHz processor and the plot shown in FIG. 3 of an exemplary adaptive CPU clock management system of the present invention. In this example, the desired idleness parameter is configured for 10% (e.g., 100 MHz) and the tolerance parameter is set to 5%. In the diagram, the clock stops clocking (100% idle) when in idle state, tries to maintain an average 10% idle measure for normal workloads (with clock speeds changing to 200 MHz, 500 MHz, 400 MHz and 90 MHz), and reduces to 3% and 0% idleness when working on very heavy payloads (clock at 900 MHz and max 1 GHz).

In particular, a user powers up his laptop in a remote area. Due to the maximum work requirements during boot process by the BIOS, peripheral, and operating system, the CPU ramps up to its max speed of 1 GHz (waveform segment 300) until the desktop appears, at which time it switches to idle state (waveform segment 302) waiting for the user to issue commands. User activity (such as when the user inserts and plays a music CD) while the CPU is idling causes the idleness measure to drop (waveform segment 304). A significant change (i.e., drop) in the idleness measure at the established clock rate prompts the clock management control module to supply higher clock speeds (waveform segment 306) which quickly settle down to 200 MHz—the actual estimated speed consumption. In this example, the 200 MHz clock signal is sufficient to run the music CD. As the clock speed reaches 200 MHz, the idleness measure increases to approximately the desired CPU idleness measure (in this example, 10%).

If additional CPU activity is required, either by user input or automatically (such as when the screen saver starts to run in the background at the same time the music is playing), the drop in idleness exceeding the tolerance measure (waveform segment 308) prompts the clock management control module to supply higher clock speeds (waveform segment 310) which quickly settle down to 500 MHz—the actual estimated speed consumption. In this example, the 500 MHz clock signal is sufficient to run the music CD and the screen saver at the same time. As the clock speed reaches 500 MHz, the idleness measure increases to approximately the desired CPU idleness measure (waveform segment 312).

When the CPU workload is reduced (such as when a user touches the mouse, which stops the screen saver and brings back the still background), the idleness (measured at block 204) increases (waveform segment 314), prompting the clock management control module to lower the system clock to 400 MHz (waveform segment 316) now that the CPU does not have to run the screen saver. In this example, the 400 MHz clock signal is sufficient to run the music CD and whatever program was activated by the user with the mouse. As the clock rate drops, the idleness measure again returns to approximately the desired idleness measure (waveform segment 318).

When the CPU workload approaches its maximum, the idleness measure is no longer able to maintain at the desired idleness measure without reducing the clock speed, so the idleness measure approaches 0% as the required CPU clock speed reaches its maximum rate. This is illustrated again with FIG. 3, which shows that an increase in the CPU workload (which can occur, for example, when the user starts to play a game with the music still playing) reduces the idleness measure (waveform segment 320). As the required workload approaches the CPU's maximum rate, the clock rate is increased (waveform segment 322) to or near its maximum (waveform segment 324, 326), but the idleness is unable to rebound to the desired idleness measure without slowing down the CPU, at least until the game is paused. Thus, the adaptive CPU clock management must accommodate the 0% idleness measure as a boundary and determine idleness measures that exist outside of the CPU idle tolerance as a function of the required clock rate in relation to the maximum clock rate. While the specific algorithm for defining an adjusted target idleness measure (e.g., waveform segment 328) may be configured to meet the specific implementation requirements of a particular application, in a selected embodiment, the adjusted target idleness measure may be calculated by applying a first factor (e.g., the proportion of the actual clock speed to the maximum clock speed) to the difference between the desired idleness measure (e.g., 10%) and a boundary (e.g., 0% idleness), and applying some additional scaling factor or parameter to the product to derive the adjusted target idleness. In the example of FIG. 3, a drop in the idleness (waveform segment 320) causes the clock rate to increase (waveform segment 322) to 900 MHz (waveform segment 324), and then an adjusted target idleness of 3% (waveform segment 328) is used until such time as the CPU reaches its maximum payload, causing the measured idleness to drop to 0% (waveform segment 329).

A measured idleness of 0% causes the clock management controller to increase the CPU clock to its maximum rate (waveform segment 325) until the CPU activity is completed. Continuing with the example depicted in FIG. 3, this is illustrated when a reduction in the CPU workload (such as might occur when the music and game programs are paused) is detected by the idleness measurement module as an increase in the idleness measure (waveform segment 330) at the established clock rate (1 GHz). This increase is used to drop the clock rate (e.g., to 90 MHz), which is the clock rate that is required for the idleness measure to be maintained at or about the desired idleness measure (waveform segment 334), as determined by the clock management control module.

Thus, as described herein, a system and method are provided for managing CPU clock speed consumption on the basis of the CPU's actual processing requirements. Those skilled in the art will appreciate that the present invention may be implemented using a variety of control parameters to address technology variations, architecture differences, response time requirements, time delays, design constraints, other circuit-specific implementation requirements, but still obtain the power saving benefits of managing the clock consumption to match actual CPU requirements.

As will be appreciated, selected embodiments of the present invention may be implemented using one or more integrated circuits. For example, the CPU 114 may be implemented on one integrated circuit and the transceiver 112 may be implemented on a second integrated circuit. Alternatively, the entire circuit functionality of the mobile computing device 102 may be implemented on a single integrated circuit. However implemented, the clock management technique for the controlling power consumption may be used for any processing unit or CPU, whether located on-chip (e.g., CPU 114) or in separate circuitry (e.g., processing module in the wireless transceiver device 112).

As described herein and claimed below, a method and apparatus are provided for controlling the CPU clock rates in order to reduce CPU power consumption. By using an idleness measure to track the clock rate to the work load requirements, the processor and associated modules may be quickly powered down and efficiently reactivated by speeding up the processor clock rates to the extent needed. This translates to a very power efficient processor. As will be appreciated, the present invention may be implemented in a computer accessible medium including one or more data structures representative of the circuitry included in the system described herein. Generally speaking, a computer accessible medium may include storage media such as magnetic or optical media, e.g., disk, CD-ROM, or DVD-ROM, volatile or non-volatile memory media such as RAM (e.g., SDRAM, RDRAM, SRAM, etc.), ROM, etc., as well as media accessible via transmission media or signals such as electrical, electromagnetic, or digital signals, conveyed via a communication medium such as a network and/or a wireless link. For example, data structure(s) of the circuitry on the computer accessible medium may be read by a program and used, directly or indirectly, to implement the hardware comprising the circuitry described herein. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium may be the netlist(s) (with or without the synthesis library) or the data set(s), as desired. In yet another alternative, the data structures may comprise the output of a schematic program, or netlist(s) or data set(s) derived therefrom. While a computer accessible medium may include a representation of the present invention, other embodiments may include a representation of any portion of the power management system described herein.

The present invention has been particularly described with reference to FIGS. 1–3 and with emphasis on selected implementation examples, but it should be understood that the figures are for illustration purposes only and should not be taken as limitations upon the present invention. In addition, it is clear that the method and apparatus of the present invention has utility in any application where a reminder may be modified or suppressed upon the occurrence of predetermined conditions. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A digital processor, comprising:
   a processing unit;
   a first processing unit control register for storing a targeted activity measure for the processing unit;
   a second processing unit control register for storing a tolerance measure;
   a processing unit clock having an adjustable clock speed;
   a measurement module for monitoring a change in the processing unit activity and issuing an interrupt if a change in the processing unit activity exceeds the tolerance measure; and
   clock control logic for detecting an interrupt and computing an adjusted clock speed for the processing unit clock, where the adjusted clock speed is a function of at least the targeted activity measure for the processing unit.

2. The digital processor of claim 1, where the adjusted clock speed causes an activity measure for the processing unit to fall within the tolerance measure of the targeted activity measure.

3. The digital processor of claim 1, where the targeted activity measure comprises a measure of the idleness of the processing unit.

4. The digital processor of claim 1, where the clock control logic computes an adjusted clock speed on a continuous basis during runtime.

5. The digital processor of claim 1, where the clock control logic computes the adjusted clock speed for the processing unit clock as a function of the tolerance measure.

6. The digital processor of claim 1, where the adjusted clock speed for the processing unit approaches a maximum clock speed when an activity measure for the processing unit approaches a first boundary.

7. The digital processor of claim 3, where the clock control logic increases the clock speed in response to a decrease in the measure of the idleness of the processing unit.

8. The digital processor of claim 3, where the clock control logic increases the clock speed in response to a decrease in the measure of the idleness of the processing unit beyond the tolerance measure.

9. The digital processor of claim 1, where the clock control logic decreases the clock speed in response to an increase in an activity measure for the processing unit.

10. The digital processor of claim 1, where the measurement module calculates a scalar value for defining a change in the processing unit activity.

11. The digital processor of claim 1, where the measurement module calculates a time rate of change for defining a change in the processing unit activity.

12. A method for managing power in a communications processor by controlling the processor clock frequency, comprising:
    storing a desired idleness parameter in a first control register;
    storing a tolerance parameter in a second control register;
    executing at least a portion of a first instruction set received by the processor at a first processor clock speed;
    issuing an interrupt if a detected idleness measure for the processor departs from the desired idleness parameter by more than the tolerance parameter; and
    adjusting the processor clock frequency so that the detected idleness measure falls within the tolerance parameter of the desired idleness parameter.

13. The method of claim 12, wherein the storing of the desired idleness parameter and tolerance parameter occurs during startup operations.

14. The method of claim 12, further comprising detecting a change in the idleness measure using a scalar measure.

15. The method of claim 12, further comprising detecting a change in the idleness measure using a time rate of change measure.

16. The method of claim 12, further comprising adjusting the processor clock frequency to a maximum frequency when the detected idleness measure reaches a boundary value.

17. The method of claim 12, wherein the detected idleness measure is permitted to go beyond the tolerance parameter of the desired idleness parameter as the processor clock frequency approaches its maximum frequency.

18. A device comprising at least one recordable medium having stored thereon executable instructions and data which, when executed by at least one processing device, cause the at least one processing device to:
    configure one or more control registers with a desired CPU idle parameter and a CPU idle tolerance parameter;
    monitor CPU workload changes from a first level of CPU activity to a second level of CPU activity; and
    change a CPU clock frequency from a first frequency to a second frequency when a predetermined CPU workload change is detected, said second frequency being calculated as a function of the desired CPU idle parameter and the CPU idle tolerance parameter.

19. The device of claim 18, where the predetermined CPU workload change is determined by measuring a CPU idleness value that departs from the desired CPU idle parameter by more than the CPU idle tolerance parameter.

20. The device of claim 18, wherein the second frequency is calculated so that a measured CPU idleness value approaches the desired CPU idle parameter.

21. A method for managing power in a processor by controlling a processor clock frequency, comprising:
    storing a targeted activity measure for a processing unit in a first processing unit control register;
    storing a tolerance measure in a second processing unit control register;
    monitoring a change in the processing unit activity and issuing an interrupt if a change in the processing unit activity exceeds the tolerance measure; and
    computing an adjusted clock speed for a processing unit clock, where the adjusted clock speed is a function of at least the targeted activity measure for the processing unit.

22. An adaptive clock management system for managing power in a processing unit by controlling a processor clock frequency, comprising:

means for storing a targeted activity measure for a processing unit;

means for storing a tolerance measure;

means for monitoring a change in the processing unit activity and issuing an interrupt if a change in the processing unit activity exceeds the tolerance measure; and means for computing an adjusted clock speed for a processing unit clock, where the adjusted clock speed is a function of at least the targeted activity measure for the processing unit.

23. The adaptive clock management system of claim 22, where the means for storing a targeted activity measure comprises a first control register.

24. The adaptive clock management system of claim 22, where the means for storing a tolerance measure comprises a second control register.

25. The adaptive clock management system of claim 22, where the processing unit comprises a CPU.

* * * * *